(12) United States Patent
Park et al.

(10) Patent No.: US 7,333,463 B2
(45) Date of Patent: Feb. 19, 2008

(54) METHOD AND SYSTEM FOR TRANSMITTING DATA USING A SAFETY CHANNEL IN A BROADBAND WIRELESS ACCESS SYSTEM

(75) Inventors: Jung-Shin Park, Seoul (KR); Geun-Hwi Lim, Seongnam-si (KR); Hong-Sung Chang, Suwon-si (KR); Jae-Jeong Shim, Seoul (KR)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 11/077,732

(22) Filed: Mar. 11, 2005

(65) Prior Publication Data

US 2005/0202822 A1 Sep. 15, 2005

(30) Foreign Application Priority Data

Mar. 12, 2004 (KR) ...................... 10-2004-0017812

(51) Int. Cl.
*H04Q 7/24* (2006.01)
(52) U.S. Cl. .......................... 370/338; 370/31; 455/436
(58) Field of Classification Search ................ 370/338, 370/331, 319, 344; 455/436, 442
See application file for complete search history.

(56) References Cited

U.S. PATENT DOCUMENTS 7,042,858 B1 * 5/2006 Ma et al. ..................... 370/331
2004/0229615 A1 * 11/2004 Agrawal ..................... 455/436

\* cited by examiner

*Primary Examiner*—Joseph Feild
*Assistant Examiner*—Kiet Doan
(74) *Attorney, Agent, or Firm*—The Farrell Law Firm, PC

(57) ABSTRACT

A method for allocating a safety channel to a handover subscriber station (SS) for data communication in an Orthogonal Frequency Division Multiple Access (OFDMA) communication system. In the method, a base station (BS) determines a bin offset indicating a safety channel to be allocated to the handover SS and the number of subchannels every frame, generates a MAP information element (IE) with a set indicator indicating allocation of the safety channel, the MAP IE including SS identifier information indicating the handover SS, information on the determined bin offset and information on the determined number of subchannels, and transmits the generated MAP IE at a MAP IE transmission time in the frame. The handover SS receives the MAP IE from the BS every frame, and transmits/receives data for a predetermined number of frames in the allocated safety channel according to the MAP IE.

17 Claims, 7 Drawing Sheets

| Syntax | Size | Notes |
|---|---|---|
| MAP_IE () { | | |
| Type = 3 | 2 | Safety Channel |
| DL/UL indication=0 | 1 | 0: DL, 1: UL |
| Basic Connection ID | 16 | |
| Nep | 4 | Encoder packet size |
| BIN Offset | 7 | |
| Nsch | 2 | |
| if (DL) { | | |
| UL continue | 1 | 0: no UL Burst,<br>1: UL burst continues |
| if (UL continue) { | | |
| Nep (UL) | 4 | Encoder packet size |
| BIN offset (UL) | 7 | |
| Nsch (UL) | 2 | |
| } | | |
| } | | |
| } | | |

FIG.3

METHOD AND SYSTEM FOR TRANSMITTING DATA USING A SAFETY CHANNEL IN A BROADBAND WIRELESS ACCESS SYSTEM

PRIORITY

This application claims priority under 35 U.S.C. § 119 to an application entitled "Method and System for Transmitting Data Using Safety Channel in a Broadband Wireless Access System" filed in the Korean Intellectual Property Office on Mar. 12, 2004 and assigned Serial No. 2004-17812, the contents of which are incorporated herein by reference.

BACKGROUND OF THE INVENTION

1. Field of the Invention

The present invention relates generally to a method and system for transmitting data in a wireless communication system, and in particular, to a method and system for transmitting data using a band Adaptive Modulation and Coding (AMC) scheme in an Orthogonal Frequency Division Multiple Access (OFDMA) system.

2. Description of the Related Art

A cellular system is a typical type of the mobile communication system. A "cellular system" is a system in which a base station (BS) communicates with a subscribed station (SS) through a wireless channel and the BS is connected to a wired network. A cellular mobile communication system using a Code Division Multiple Access (CDMA) scheme (hereinafter referred to as a "CDMA cellular mobile communication system") is a typical system of the cellular system.

Although the cellular system was fundamentally developed to support voice communication, various systems capable of providing a data service have been recently proposed. In addition, the amount of data required by each user is steadily increasing, as users demand to transmit larger amounts of data at higher speeds. Therefore, various research is being conducted for a CDMA cellular system to meet these demands.

Additionally, research into an Orthogonal Frequency Division Multiplexing (OFDM) system, which is different from the CDMA system, is being made to provide users with the larger amount of data at high speed. The commercialization of the OFDM system is now under discussion. For example, the Institute of Electrical and Electronics Engineers (IEEE) 802.16 standardization group, one of the international standardization groups, is about to establish an IEEE 802.16d standard as a standard for providing a broadband wireless Internet service to a fixed SS.

The OFDM scheme can be defined as a 2-dimensional access scheme, which is a combination of a Time Division Access (TDA) technique and a Frequency Division Access (FDA) technique. IEEE P802.16d/D3-2004 uses an Orthogonal Frequency Division Multiple Access (OFDMA) scheme which divides a full frequency band per subcarrier, groups the subcarriers into subchannels each having a predetermined number of subcarriers, and separately allocates the subchannels to users. Thus, all SSs in the system use subchannels, each comprised of subcarriers dispersed over the full frequency band. Therefore, a system using the OFDMA scheme (hereinafter referred to as an "OFDMA system") carries data on some of the subcarriers included in a particular subchannel.

In a broadband OFDMA system, all SSs connected to a BS share a channel, and an interval for which each SS uses a channel is allocated by the BS every frame. Therefore, the BS divides access information into uplink access information and downlink access information, and arranges the uplink access information and the downlink access information at the head of each frame, before transmission to all SSs.

FIG. 1 is a diagram illustrating a frame structure including an uplink and a downlink in a conventional broadband OFDMA system. In FIG. 1, a vertical axis represents subchannel numbers 147 (S, S+1, S+2, ..., S+L) and a horizontal axis, which is a time axis 't', represents OFDMA symbol numbers 145.

Referring to FIG. 1, a frame is time-divided into a downlink (DL) 149 and an uplink (UL) 153, and an OFDMA frame includes a plurality of OFDMA symbols, for example, 12. An OFDMA symbol includes a plurality of subchannels, for example, L. Such an OFDMA system is a communication system that acquires a frequency diversity gain by dispersing data subcarriers used therein over the full frequency band.

The downlink 149 includes at the head thereof, a preamble 111 for acquiring synchronization between a transmitting SS and a receiving BS. The downlink 149 also includes broadcast data information such as a frame control header (FCH) 113, a DL_MAP 115, and a UL_MAP 117, and finally includes DL bursts 121, 123, 125, 127, and 129 for transmission symbols.

The uplink 153 includes at the head thereof, preambles 131, 133, and 135 for acquiring synchronization between a transmitting SS and a receiving BS. The uplink 153 also includes UL bursts 137, 139, and 141, and includes a ranging subchannel 143 for controlling reception power of the BS. Information on positions and allocation of the UL bursts 137, 139, and 141, and the DL bursts 121, 123, 125, 127, and 129 are provided to the SS by the BS through the DL_MAP 115 and the UL_MAP 117, and based on this information, the SS is variably allocated a subchannel, which is a combination of a frequency and a symbol, every frame, and communicates with the BS using the allocated subchannel. That is, the SS uses a different subchannel every frame, instead of a fixed subchannel.

The frame has a predetermined time gap, i.e., a Transmit/receive Transition Gap (TTG) 151 for which no data transmission is achieved, in an interval where transition from a downlink to an uplink occurs. In addition, the frame has a predetermined time gap, i.e., a Receive/transmit Transition Gap (RTG) 155 for which no data transmission is achieved, in an interval where transition from an uplink to a downlink occurs, i.e., where transitions from one frame to another frame occurs. After a lapse of the transition time, a preamble region is provided for an SS to acquire system synchronization.

In this frame, data for each SS is coded and modulated according to the best coding rate and modulation scheme before being transmitted through a wireless channel. For example, the coding rate and the modulation scheme can be selected according to a position of an SS located in a cell. That is, a change in state of a channel between a BS and an SS depends upon a position of the SS.

As to the channel state depending on the SS's position, an SS located in the center of a cell tends to have the best channel state. Therefore, the SS located in the center of a cell uses a high-efficiency modulation scheme, i.e., a high-order modulation scheme, and a high-transmission efficiency coding rate, i.e., a high coding rate. However, an SS located in a cell boundary has the worst channel state due to interferences from neighbor BSs. Therefore, the SS located in the cell boundary uses a low-efficiency modulation scheme, i.e., a low-order modulation scheme, and a low-transmission efficiency coding rate, i.e., a low coding rate, thereby securing safe data transmission.

However, in the conventional OFDMA system in which a subchannel including subcarriers dispersed over the full frequency band is used, high-efficiency modulation scheme and coding rate can be used only when it is determined that a state of a channel through which data is to be transmitted is good. Therefore, it is impossible for an SS to change a coding rate and a modulation scheme according to its channel quality using only some frequency bands, quality of which is determined to be good.

Generally, even the channel, a state of a subchannel of which is reported to be very bad, can show high quality because a subchannel includes a plurality of frequency bands, i.e., a plurality of subcarriers. That is, among subcarriers included in a particular subchannel, a state of which is reported to be bad, particular subcarriers can show high quality. In this case, therefore, data transmission efficiency can be increased if a method for transmitting data with high-efficiency modulation scheme and coding rate using only the frequency bands showing high quality is used instead of a method for selecting a modulation scheme and a coding rate depending on qualities of all channels.

When an SS is located in a cell boundary, its channel quality often deteriorates due to interference from other cells. If a particular frequency band in which an SS can have good channel quality even in the cell boundary is provided, the foregoing efficiency transmission can be achieved using this band. A channel previously reversed in each cell for this purpose is called a "safety channel." The safety channel is well disclosed in Korean patent application No. 2004-15218 filled by the applicant on Mar. 5, 2004. However, there is no currently available method for providing UL_MAP (uplink mobile application part) and DL_MAP (downlink mobile application part) for the safety channel.

SUMMARY OF THE INVENTION

It is, therefore, an object of the present invention to provide a method and system for transmitting data at high speed using a safety channel according to a channel state of an SS in a Broadband Wireless Access system.

It is another object of the present invention to provide a data transmission method and system for generating a new MAP information element (IE) to use a safety channel in a Broadband Wireless Access system.

It is further another object of the present invention to provide a method and system for transmitting data with reduced overhead by simultaneously allocating UL bursts and DL bursts using a new MAP IE in a Broadband Wireless Access system in which a safety channel is used.

In accordance with one aspect of the present invention, there is provided a method for allocating a safety channel to a handover subscriber station (SS) for data communication in an Orthogonal Frequency Division Multiple Access (OFDMA) communication system. The method includes the steps of: determining, by a base station (BS), a bin offset indicating a safety channel to be allocated to the handover SS and the number of subchannels every frame, generating a MAP information element (IE) with a set indicator indicating allocation of the safety channel, the MAP IE including SS identifier information indicating the handover SS, information on the determined bin offset and information on the determined number of subchannels, transmitting the generated MAP IE at a MAP IE transmission time in the frame; receiving, by the handover SS, the MAP IE from the BS every frame; and transmitting/receiving data for a predetermined number of frames in the allocated safety channel by analyzing the MAP IE.

In accordance with another aspect of the present invention, there is provided an Orthogonal Frequency Division Multiple Access (OFDMA) system, which transmits downlink data to a handover subscriber station (SS) using a safety channel. The system includes: a base station (BS) for determining a bin offset indicating a safety channel to be allocated to the handover SS and the number of subchannels every frame, generating a MAP information element (IE) with a set indicator indicating allocation of the safety channel, the MAP IE including SS identifier information indicating the handover SS, information on the determined bin offset and information on the determined number of subchannels, and transmitting the generated MAP IE at a MAP IE transmission time in the frame; and the handover SS for receiving the MAP IE from the BS every frame, and transmitting data for a predetermined number of frames in the allocated safety channel by analyzing the MAP IE.

In accordance with further another aspect of the present invention, there is provided a method for allocating, by a base station (BS), a safety channel to a handover subscriber station (SS) for data communication in an Orthogonal Frequency Division Multiple Access (OFDMA) system. The method includes the steps of: determining a bin offset indicating a safety channel to be allocated to the handover SS and the number of subchannels every frame; generating a MAP information element (IE) with a set indicator indicating allocation of the safety channel, the MAP IE including SS identifier information indicating the handover SS, information on the determined bin offset and information on the number of subchannels; and transmitting the generated MAP IE at a MAP IE transmission time in the frame.

In accordance with still another aspect of the present invention, there is provided a method for performing data communication by a handover subscriber station (SS) upon receiving an allocated safety channel in an Orthogonal Frequency Division Multiple Access (OFDMA) system which allocates a safety channel to the handover SS. The method includes the steps of: receiving a MAP information element (IE) from a base station (BS) every frame, the MAP IE including SS identifier information indicating the handover SS, information on a bin offset, information on the number of subchannels, and an indicator indicating allocation of the safety channel; and upon receiving the MAP IE, determining whether the MAP IE indicates the handover SS itself, and if the MAP IE indicates the handover SS itself, transmitting/receiving data for a predetermined number of frames in the allocated safety channel by analyzing the MAP IE.

BRIEF DESCRIPTION OF THE DRAWINGS

The above and other objects, features, and advantages of the present invention will become more apparent from the following detailed description when taken in conjunction with the accompanying drawings in which:

FIG. 3 is a diagram illustrating a format of a MAP IE for use of a safety channel according to an embodiment of the present invention;

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention proposes a method for constructing a new MAP information element (IE) needed to use a safety channel in a Broadband Wireless Access system, and a method in which a base station (BS) and a subscriber station (SS) generate and analyze the MAP IE. The safety channel has been proposed to enable a particular SS to have a high-quality channel by leaving reserved channels unused in each cell to reduce interference to an SS of a neighbor cell, located in a cell boundary. Unlike the conventional scheme of grouping subcarriers, the new scheme using safety channels exclusively allocates a small-scale frequency band to a specific SS as a subchannel.

Herein, the present invention is applied to an Orthogonal Frequency Division Multiple Access (OFDMA) system, which is a kind of a Broadband Wireless Access (BWA) system. In the OFDMA system in which a BS and an SS use a safety channel, the BS provides the SS with allocation information used for the safety channel. Accordingly, it is necessary to define a new MAP IE. Also, a method for minimizing possible overhead generated during transmission of the new MAP IE should be taken into consideration. In the following description, the present invention defines a new MAP IE having reduced overhead needed to use a safety channel in a Broadband Wireless Access system, and proposes a method for generating and analyzing the MAP IE.

Figure 1:
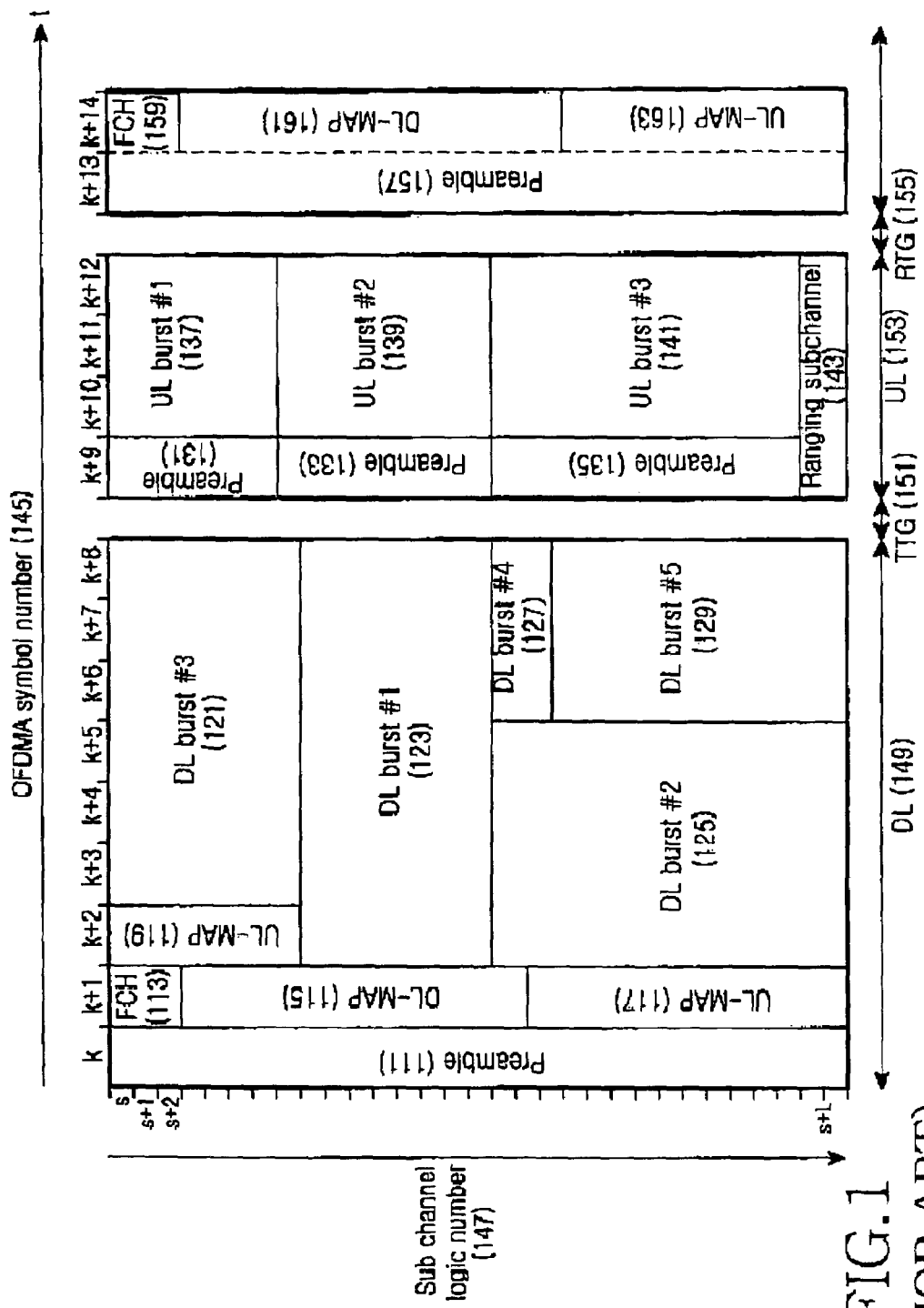
FIG. 1 is a diagram illustrating a frame structure including an uplink and a downlink in a conventional broadband OFDMA system.
Figure 2:
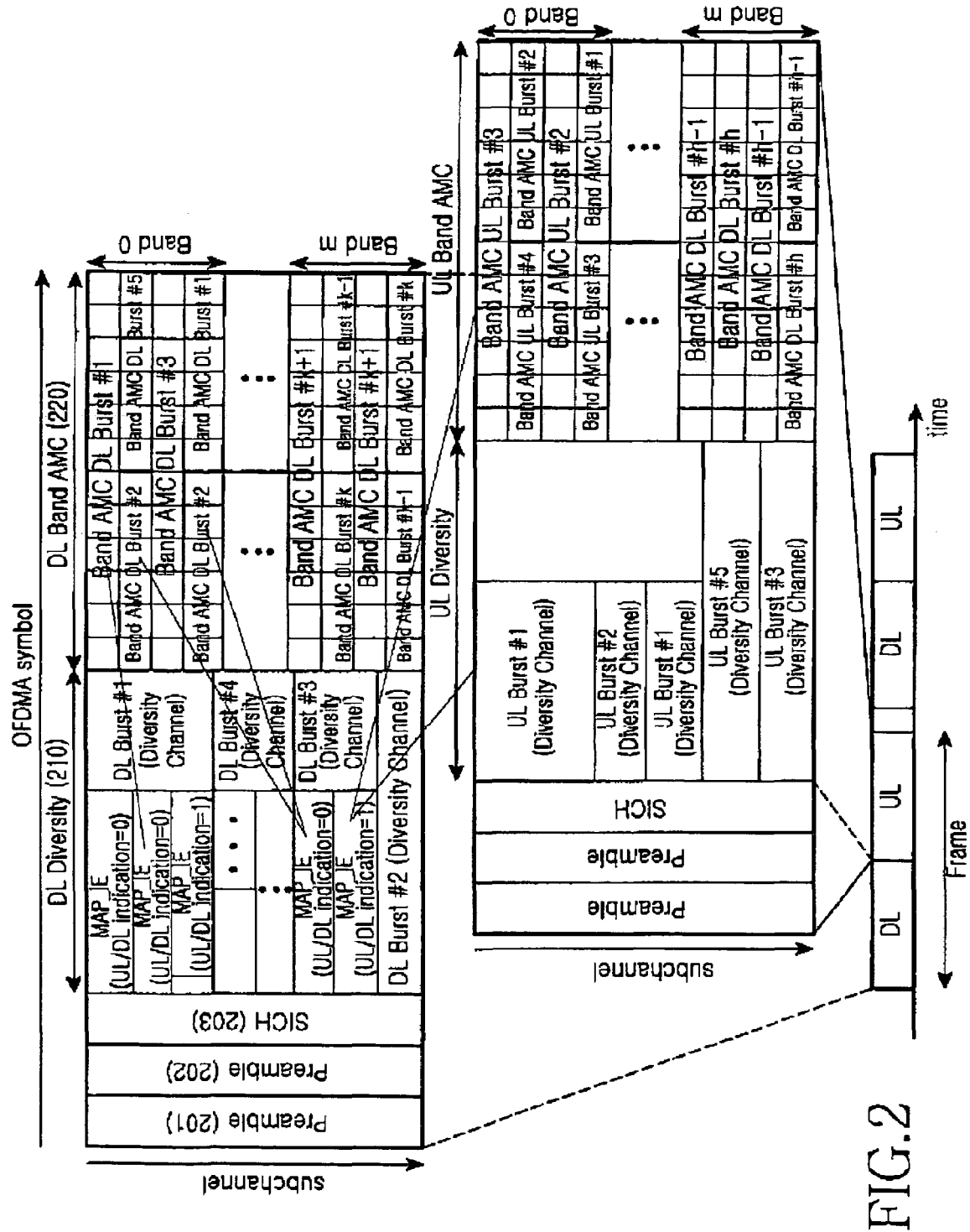
FIG. 2 is a diagram illustrating downlink/uplink (DL/UL) frame structure in a broadband OFDMA system using a band Adaptive Modulation and Coding (AMC) scheme according to an embodiment of the present invention.

FIG. 2 is a diagram illustrating downlink/uplink (DL/UL) frame structure in a broadband OFDMA system using a band Adaptive Modulation and Coding (AMC) scheme according to an embodiment of the present invention. In FIG. 2, there are (k+1) DL band AMC subchannels and h UL band AMC subchannels. The DL band AMC subchannels and the UL band AMC subchannels are represented by Band AMC DL Burst #k+1 and Band AMC UL Burst #h, respectively. Further, a horizontal axis represents an OFDMA symbol and a vertical axis represents a subchannel.

Referring to FIG. 2, in the frame, a frequency band on the vertical axis is divided into (m+1) sub frequency bands Band#0, Band#1, Band#2, . . . , Band#m, and each OFDM symbol on the horizontal axis, i.e., a time axis 't', is divided into bins. Herein, the term "bin" refers to an allocation unit used in a band AMC channel including a predetermined number of subcarriers.

More specifically, the frame is divided into a downlink (DL) and an uplink (UL), and each link includes preambles arranged in first two OFDMA symbol regions, and a system information channel (SICH) arranged in the next OFDMA symbol region. The SICH is a broadcast channel that all SSs should receive. Subsequent control regions include a DL diversity region having DL/UL MAP IEs and a DL band AMC region having band AMC DL bursts.

The DL diversity region includes MAP IEs for designating positions and corresponding SSs of respective DL/UL bursts transmitted through a diversity subchannel and a band AMC subchannel. Herein, DL MAP IEs and UL MAP IEs are arranged in a mixed way instead of being separately arranged as done in the conventional method. This is possible because in the OFDMA system illustrated FIG. 2, the UL MAP IEs and the DL MAP IEs have the common elements. Because the UL MAP IEs and the DL MAP IEs use the same type and are arranged in a mixed way, each MAP IE has a DL/UL indication field to distinguish between a UL and a DL. Based on this value, it is possible to determine if a corresponding MAP IE is a UL MAP IE or a DL MAP IE.

As to the MAP IEs of FIG. 2, MAP IEs for diversity subchannels and MAP IEs for band AMC subchannels can also be arranged in a mixed way. Each MAP IE has a Type field to distinguish between the MAP IEs for diversity subchannels and the MAP IEs for band AMC subchannels. A detailed description thereof will be made later.

A BS variably allocates a bin located in a sub frequency band in which a corresponding SS shows the best channel state, among the sub frequency bands, and information on the allocated position is broadcast through a control region for transmission of the MAP IE of the frame using the MAP IE proposed in the present invention. Herein, the number of allocated bins is represented by a value of Nsch. For example, 6 bins can constitute one transmission unit for burst transmission. In this case, if one transmission unit is allocated to one SS, 6 bins are allocated to one SS. If 2 transmission units are allocated to one SS, 12 bins are allocated to one SS. If 4 transmission units are allocated to one SS, 24 bins are allocated to one SS.

When multiple bins are grouped into one transmission unit in this way, the number of bins generally depends upon a bandwidth. For a bandwidth of 10 MHz, 6 bins can be grouped into one transmission unit, and for a bandwidth of 20 MHz, 12 bins can be grouped into one transmission unit. That is, the transmission unit is changeable according to system.

A description will now be made of an example in which data is transmitted to each SS per the transmission unit.

For example, as illustrated in FIG. 2, a first Band AMC DL burst is transmitted through a subchannel including 12 bins and a subchannel including 6 bins, a third Band AMC DL burst is transmitted through a subchannel including 12 bins, and a second Band AMC DL burst is transmitted through two subchannels, each including 6 bins. A fifth Band AMC DL burst is transmitted through a subchannel including 6 bins, and although not illustrated in FIG. 2, a fourth Band AMC DL burst is transmitted through one of the sub frequency bands.

Safety channels are allocated to the sub frequency bands in a predetermined manner. The safety channels are used for handover of an SS. More specifically, when an SS communicates in a coverage area of a particular BS, the SS transmits data through particular subchannels as illustrated in FIG. 2. Each of the subchannels includes a plurality of subcarriers. Therefore, when the SS moves from coverage of its current BS to coverage of a neighbor BS, it receives data from the neighbor BS with the same subcarriers as those used in the current BS. In this case, the SS cannot perform smooth communication because of interference between the same subcarriers. Therefore, the SS performs communication using the safety channels according to the present invention. That is, an SS detects a safety channel, which is a channel unused in a neighbor BS, and requests its current BS for communication through the detected channel.

The current BS in communication with the SS performing handover (hereinafter referred to as a "handover SS") allocates the requested channel, i.e., the safety channel, to the handover SS, for smooth communication. The safety channel should be allocated before and until the handover of the SS is ended. In addition, the BS should inform the SS of availability of the safety channel, and should also inform the SS of an allocation time in order to prevent a particular safety channel from being occupied by only one SS.

FIG. 3 is a diagram illustrating a MAP IE for use of a safety channel according to an embodiment of the present invention. As illustrated in FIG. 3, a Type field of first two bits represents a type of a MAP IE. Herein, the Type field is formed to support a total of 4 types: diversity, band AMC, circuit stream, and safety. Because the types are not directly related to the present invention, a detailed description thereof will be omitted. Further, as the safety channel is used herein, the Type field is set to 3, by way of example. Additionally, although a Type value for the safety channel is denoted herein by 3, it can be denoted by another number.

A 1-bit DL/UL indication field is an identifier for distinguishing between a DL and a UL, and is set to '0' when a corresponding MAP IE indicates allocation of a DL band AMC subchannel and to '1' when the corresponding MAP IE indicates allocation of a UL band AMC subchannel. Unlike the MAP IE used in the conventional IEEE 802.16 system, the new MAP IE uses a common type as occasion demands, instead of using different types for the UL bursts and the DL bursts. With the use of the DL/UL indication field, it is possible to form a single MAP IE indicating UL and DL burst information as needed, contributing to a reduction in system overhead used for announcing a MAP IE.

A 16-bit Basic Connection ID (CID) field indicates a connection ID of an SS that will receive a corresponding MAP IE. As each SS is allocated one Basic CID when it makes an initial access to a BS, an SS that will receive a MAP IE is indicated using the Basic CID. An SS designated as a destination for a MAP IE through a value of the Basic CID analyzes the contents of respective parameters included in a received MAP IE to determine a position of a subchannel through which it will exchange data with a BS, and transmits and receives data through the corresponding subchannel at a predetermined time.

A 4-bit Nep field indicates an encoder packet size of UL bursts or DL bursts that an SS should transmit or receive based on a corresponding MAP IE. A 7-bit Bin Offset field indicates a position of a bin used as a safety channel. A subsequent 2-bit Nsch field indicates a subchannel's size and position in a bin designated as a position of a data burst that an SS should receive based on the Bin Offset information.

A 1-bit UL continue field indicates information for immediately including reduced UL MAP information for the same SS when a UL MAP IE allocated to an SS is needed in the same frame, for a DL MAP IE. Herein, if the UL continue field is set to '1', only the allocation-related information, not including the repeated information such as Type, DL/UL indication, and Basic CID in the UL MAP IE allocated to the same SS, can be used, thereby reducing overhead caused by the MAP IE. The other fields Nep (UL), Bin Offset (UL) and Nsch (UL) are equal to those described in conjunction with the DL MAP IE except that they indicate UL information. Therefore, a detailed description thereof will be omitted.

With reference to the accompanying drawings, a description will now be made of an operation of generating a MAP IE. The foregoing information is generated at the request of a handover SS or when a BS detects a handover SS, as described above. For convenience, it will be assumed herein that the information is generated when a handover SS requests a safety channel.

Figure 4A:
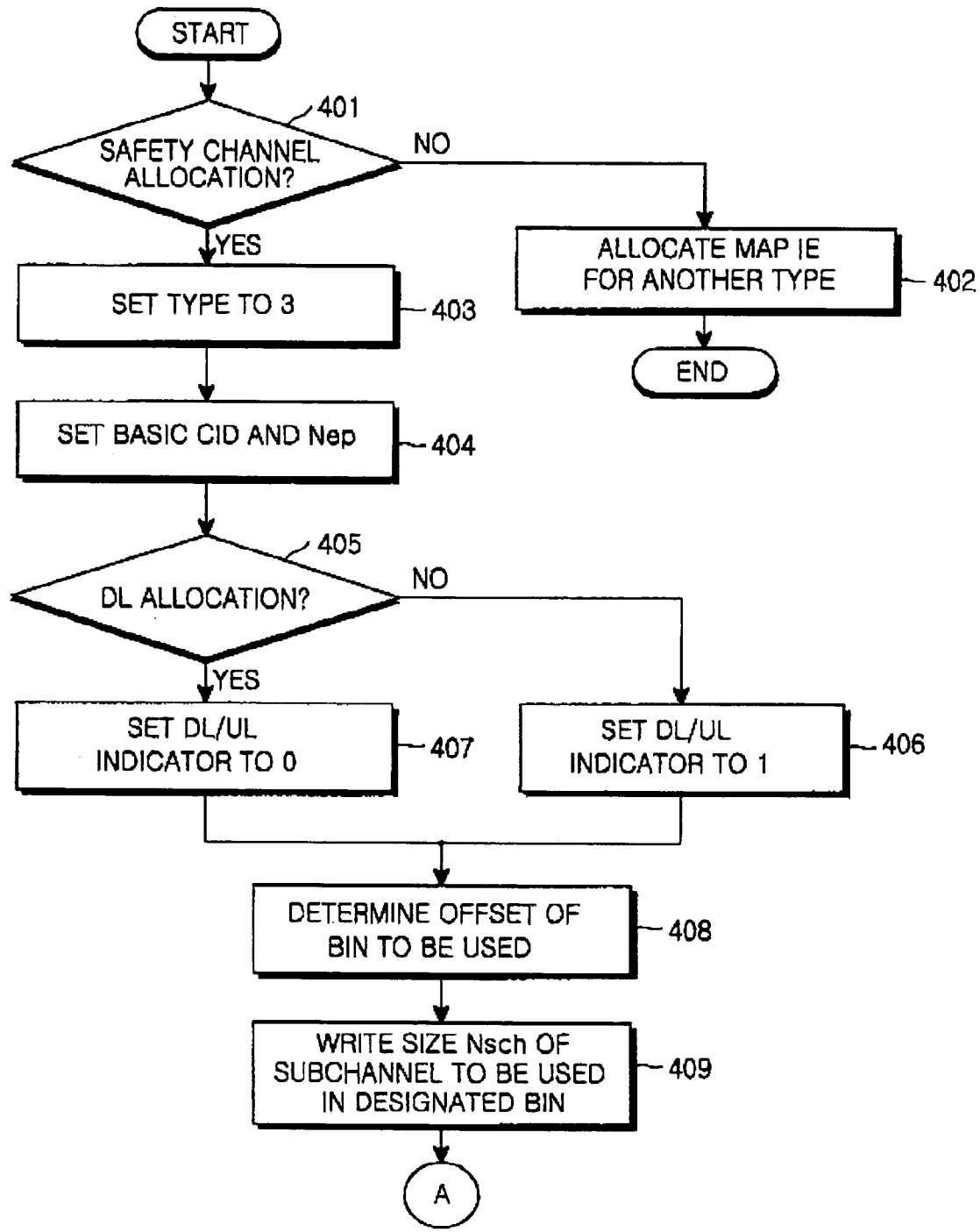
FIGS. 4A and 4B are flowcharts illustrating an operation of generating a MAP IE for use of a safety channel according to an embodiment of the present invention.
Figure 4B:
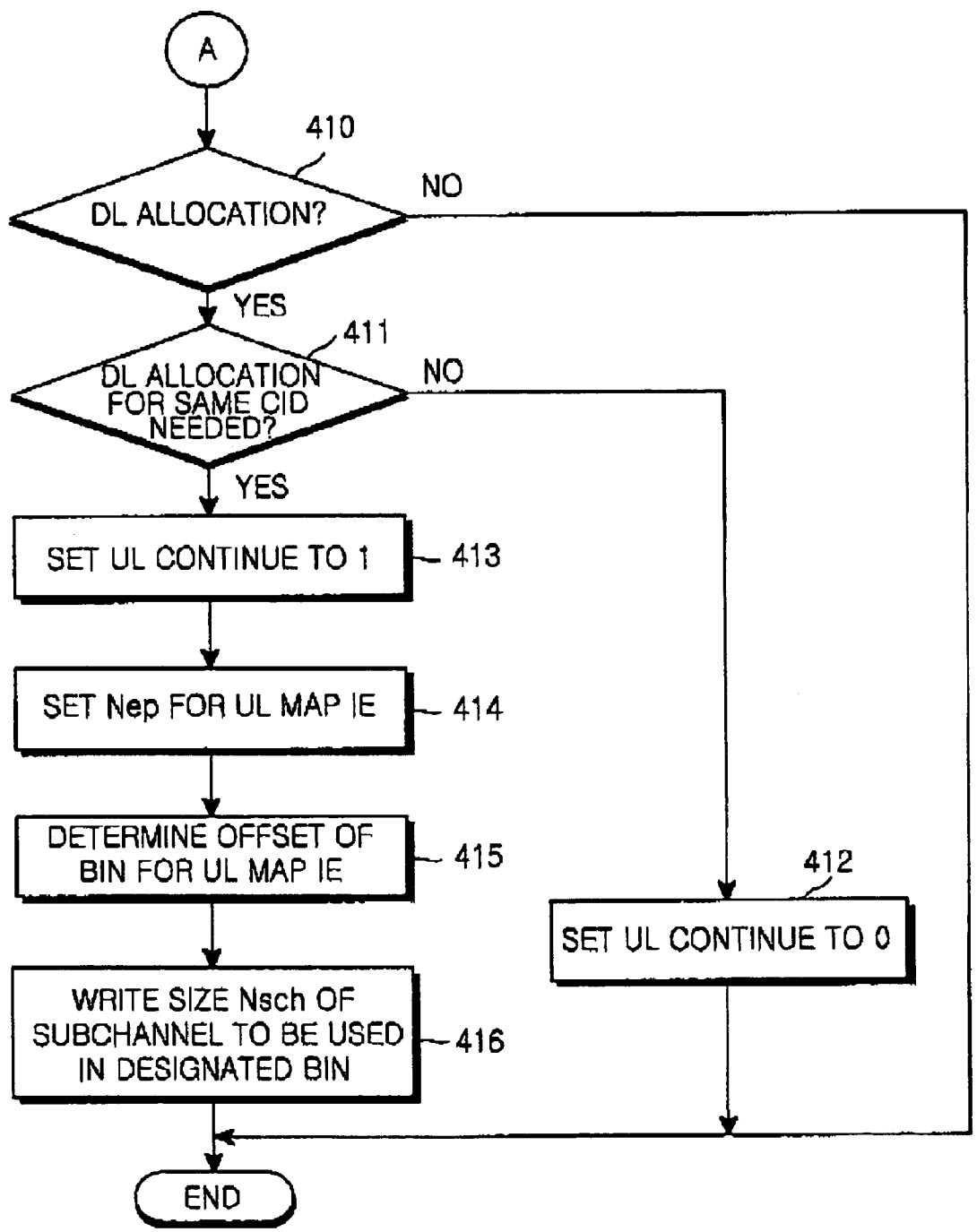

FIGS. 4A and 4B are flowcharts illustrating an operation of generating a MAP IE for use of a safety channel according to an embodiment of the present invention. Because the MAP IE is information with which a BS will inform an SS of an allocated frequency band and a selected coding rate, the operation of FIGS. 4A and 4B will be described for the BS.

Referring to FIGS. 4A and 4B, in step 401, a BS determines if type allocation for a MAP IE corresponds to allocation for a safety channel. As described above, the determination is performed at the request of a handover SS or when a BS detects a handover SS. If it is determined that the type allocation for the MAP IE does not correspond to allocation for a safety channel, the BS allocates a MAP IE for a diversity channel in step 402, and then ends its operation. However, if it is determined that the type allocation for the MAP IE corresponds to allocation for a safety channel, the BS sets the Type field to '3' in step 403.

In step 404, the BS sets an ID of an SS that will receive a corresponding MAP IE, in a Basic CID field, and sets an encoder packet size of UL bursts or DL bursts that the SS should transmit or receive, in a Nep field.

In step 405, the BS determines if corresponding allocation is DL allocation or UL allocation. If it is determined that the corresponding allocation is allocation of UL Band AMC subchannels, the BS sets a DL/UL indicator to '1' in step 406, and then proceeds to step 408. However, if the corresponding allocation is allocation of DL Band AMC subchannels, the BS sets the DL/UL indicator to '0' in step 407, and then proceeds to step 408.

In step 408, the BS determines an offset value of a bin, to be used for a Bin Offset field. In step 409, the BS sets a size of a subchannel to be used in a bin designated in an Nsch field.

In step 410, the BS determines if the foregoing allocation is DL allocation. If the foregoing allocation is not DL allocation, the BS ends its operation. However, if the foregoing allocation is DL allocation, in step 411, the BS determines of allocation of UL resources having the same CID is needed. If it is determined that allocation of UL resources having the same CID is not needed, the BS sets a UL continue field to '0' in step 412, and then ends its operation.

However, if it is determined in step 411 that allocation of LL resources having the same CID is needed, the BS sets the UL continue field to '1' in step 413, and sets an Nep field for a UL MAP IE in step 414. Thereafter, the BS determines an offset value of a bin for a UL MAP IE in step 415, and then writes a size of a subchannel to be used in a bin designated by a UL MAP IE in the Nsch field in step 416. Herein, the offset value of the bin indicates a bin set up as a safety channel of a neighbor BS, to be allocated to an SS. The Nsch field is provided to prevent a safety channel of a neighbor BS from being exclusively used for only one SS and to allow the safety channel to be shared with another handover SS.

Figure 5A:
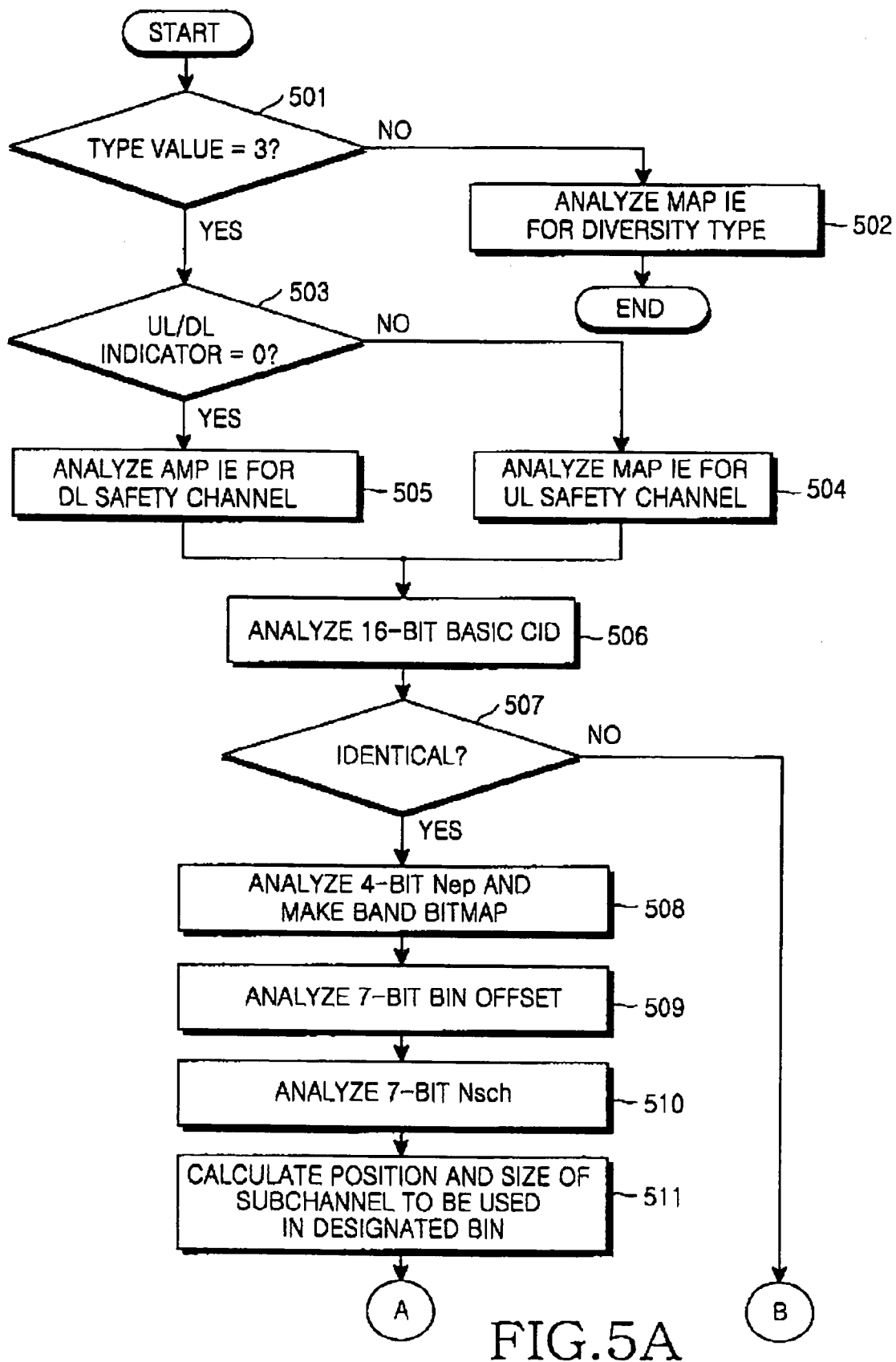
FIGS. 5A and 5B are flowcharts illustrating SS operations for analyzing a generated MAP IE according to an embodiment of the present invention.
Figure 5B:
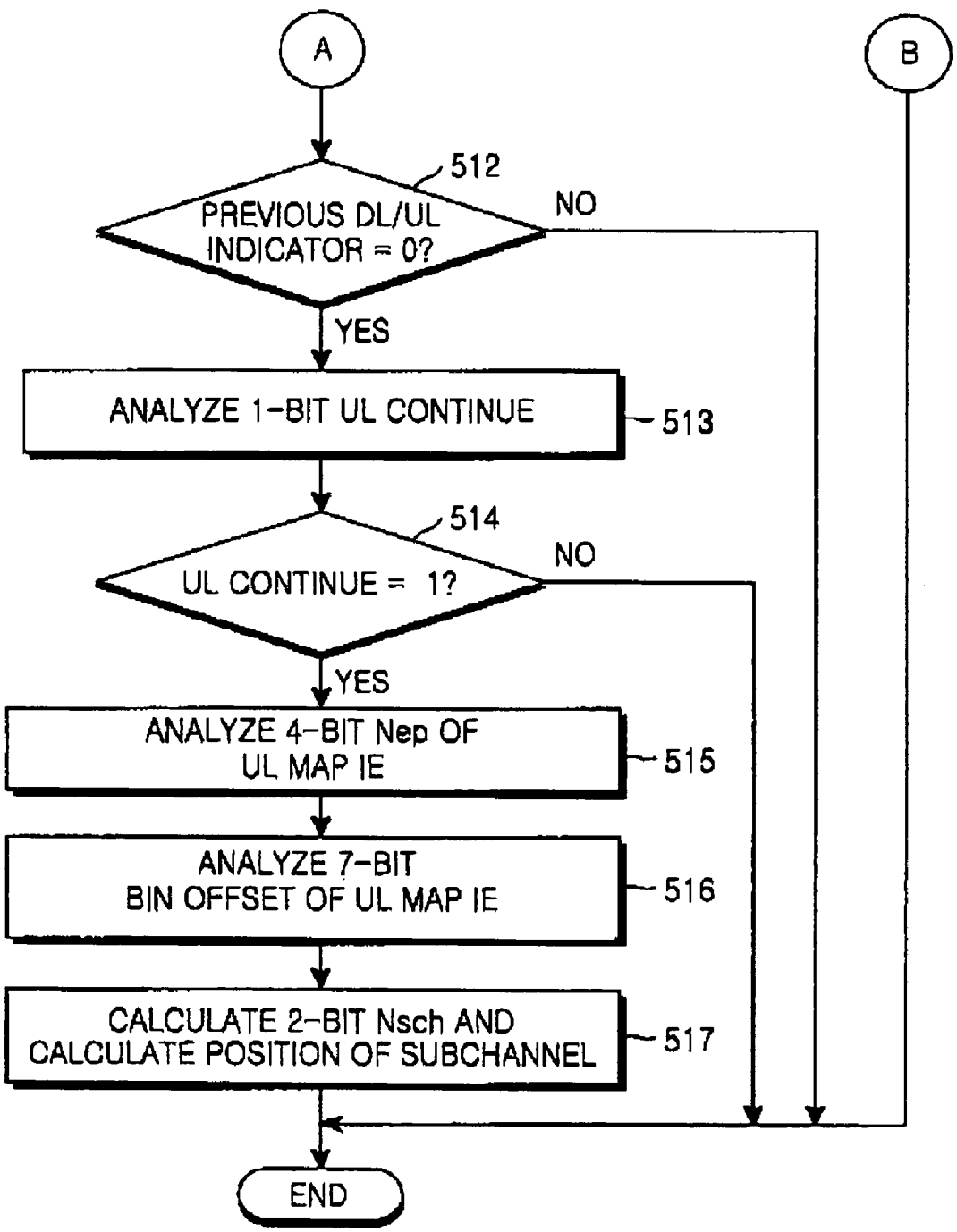

FIGS. 5A and 5B are flowcharts illustrating SS operations for analyzing a generated MAP IE according to an embodiment of the present invention. Referring to FIGS. 5A and 5B, in step 501, an SS analyzes a received MAP IE to identify a Type field value included therein. If the Type field value is not set to '3', the SS analyzes a MAP IE for another type in step 502, and then ends its operation. However, if the Type field value is set to '3', in step 503, the SS determines if a subsequent 1-bit DL/UL indicator field value is set to '0'. If the DL/UL indicator field value is not set to '0', the SS analyzes a MAP IE for a UL safety channel in step 504. If the DL/UL indicator field value is set to '0', the SS analyzes a MAP IE for a DL safety channel in step 505. In step 506, the SS analyzes a subsequent 16-bit Basic CID field.

In step 507, the SS determines if a Basic CID included in a MAP IE received from a BS is identical to its own Basic CID allocated during initial setup. If the Basic CID included in the received MAP IE is not identical to its own Basic CID, the SS ends its operation. However, if the Basic CID included in the received MAP IE is identical to its own Basic CID, the SS analyzes a subsequent 4-bit Nep field in step 508 to determine an encoder packet size of DL bursts or UL bursts that the SS should transmit or receive, i.e., to make a band bitmap.

The SS analyzes a subsequent 7-bit Bin Offset field value in step 509, analyzes a subsequent 2-bit Nsch field value in step 510, and calculates a position and size of a subchannel to be used in the designated bin in step 511.

In step 512, the SS determines a value of a previously analyzed DL/UL indicator. If the DL/UL indicator value is not '0', i.e., if a previously analyzed value indicates a UL MAP IE, the SS ends its operation. However, if the DL/UL indicator value is '0', i.e., if the previously analyzed value indicates a DL MAP IE, the SS analyzes a subsequent 1-bit UL continue field value in step 513.

Thereafter, in step 514, the SS determines if the analyzed UL continue field value is 1. If it is determined that the analyzed UL continue field value is not 1, the SS ends its operation. However, if the analyzed UL continue field value is 1, the SS analyzes a next 4-bit Nep field of a UL MAP IE in step 515, and determines the subsequent 7 bits as an offset value of a bin in the UL MAP IE in step 516. In step 517, the SS analyzes a subsequent 2-bit Nsch field to calculate a position of a subchannel, and then ends its operation.

As described above, the present invention generates and analyzes a new MAP IE needed for use of a safety channel in a Broadband Wireless Access system, thereby efficiently allocating a safety channel to each SS and selecting coding and modulation schemes to be used for the safety channel.

In addition, with the use of a common type to indicate MAP information for DL/UL bursts, it is possible to form a single MAP IE indicating UL and DL burst information as needed, thereby reducing system overhead used for announcing a MAP IE.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for allocating a safety channel to a handover subscriber station (SS) for data communication in an Orthogonal Frequency Division Multiple Access (OFDMA) communication system, the method comprising the steps of:

determining, by a base station (BS), a bin offset indicating a safety channel to be allocated to the handover SS and a number of subchannels;

generating a MAP information element (IE) with a set indicator indicating allocation of the safety channel, the MAP IE including SS identifier information indicating the handover SS, information on the determined bin offset, and information on the determined number of subchannels;

transmitting the generated MAP IE at a MAP IE transmission time in a frame;

receiving, by the handover SS, the MAP IE from the BS and transmitting and receiving data for a predetermined number of frames in the allocated safety channel according to the MAP IE.

2. The method of claim 1, wherein the MAP IE includes a uplink indicator wherein when channels are allocated to both a downlink and an uplink, the MAP IE includes only remaining information, not including repeated information, following information on the uplink.

3. The method of claim 2, wherein the MAP IE further includes information on a number of encoder packets.

4. An Orthogonal Frequency Division Multiple Access (OFDMA) system using a safety channel, the system comprising:

a handover subscriber station (SS); and a base station (BS) for determining a bin offset indicating a safety channel to be allocated to the handover SS and a number of subchannels, generating a MAP information element (IE) with a set indicator indicating allocation of the safety channel, and transmitting the generated MAP IE at a MAP IE transmission time in a frame;

wherein the MAP IE includes SS identifier information indicating the handover SS, information on the determined bin offset, and information on the determined number of subchannels, and wherein the handover SS receives the MAP IE from the BS every frame, and transmits data for a predetermined number of frames in the allocated safety channel according to the MAP IE.

5. A method for allocating, by a base station (BS), a safety channel to a handover subscriber station (SS) for data communication in an Orthogonal Frequency Division Multiple Access (OFDMA) system, the method comprising the steps of:

determining a bin offset for indicating the safety channel to be allocated to the handover SS and a number of subchannels;

generating a MAP information element (IE) with a set indicator for indicating allocation of the safety channel, the MAP IE including SS identifier information for indicating the handover SS, information on the determined bin offset, and information on the number of subchannels; and transmitting the generated MAP IE at a MAP IE transmission time in a frame.

6. The method of claim 5, further comprising the step of determining if a corresponding SS is a handover SS before allocating the safety channel.

7. The method of claim 6, wherein the step of determining if the corresponding SS is the handover SS comprises the step of determining if there is a safety channel request from the BS.

8. The method of claim 5, wherein the MAP IE includes a uplink indicator wherein when channels are allocated to both a downlink and an uplink, the MAP IE includes only remaining information following information on the uplink, not including repeated information.

9. The method of claim 8, wherein the MAP IE further includes information on a number of encoder packets.

10. A method for transmitting and receiving data in a handover subscriber station (SS), upon receiving an allocated safety channel in an Orthogonal Frequency Division Multiple Access (OFDMA) system that allocates a safety channel to the handover SS, the method comprising the steps of:

receiving a MAP information element (IE) from a base station (BS) every frame, the MAP IE including SS identifier information for indicating the handover SS, information on a bin offset, information on a number of subchannels, and an indicator for indicating allocation of the safety channel;

upon receiving the MAP IE, determining if the MAP IE indicates the handover SS; and transmitting and receiving data for a predetermined number of frames in the allocated safety channel according to the MAP IE.

11. The method of claim 10, wherein the MAP IE includes an uplink indicator wherein when channels are allocated to both a downlink and an uplink, the MAP IE includes only remaining information following information on the uplink, not including repeated information.

12. A method for allocating, by a base station (BS), a safety channel to a handover subscriber station (SS) for data communication in an Orthogonal Frequency Division Multiple Access (OFDMA) system, the method comprising the steps of:

transmitting a MAP information element (IE) including a indicator for indicating allocation of the safety channel, the SS identifier information for indicating the handover SS, and information on the determined bin offset, at a MAP IE transmission time in a frame; and receiving data burst from SS according to the MAP IE.

13. The method of claim 12, further comprising the step of determining if a corresponding SS is a handover SS before allocating the safety channel.

14. The method of claim 13, wherein the step of determining if the corresponding SS is the handover SS comprises the step of determining if there is a safety channel request from the BS.

15. The method of claim 12, wherein the MAP IE includes a /uplink indicator wherein when channels are allocated to both a downlink and an uplink, the MAP IE includes only remaining information following information on the uplink, not including repeated information.

16. The method of claim 12, wherein the MAP IE further includes information on a number of encoder packets.

17. The method of claim 12, wherein the MAP IE further includes information on the number of subchannels.

\* \* \* \* \*